May 11, 1965  R. P. GOLDSTEIN  3,183,496

POSITION INDICATING ARRANGEMENT

Filed June 15, 1961

WITNESSES
Leon J. Vaja
Edward F. Possessky

INVENTOR
Robert P. Goldstein
BY
ATTORNEY

United States Patent Office 3,183,496
Patented May 11, 1965

3,183,496
POSITION INDICATING ARRANGEMENT
Robert P. Goldstein, Forest Hills, Pa., assignor to Westinghouse Electric Corporation, East Pittsburgh, Pa., a corporation of Pennsylvania
Filed June 15, 1961, Ser. No. 117,223
10 Claims. (Cl. 340—196)

The present invention relates to position indicating arrangements and more particularly to such arrangements employed in conjunction with linear motion devices.

When it is desired to impart linear or other motion to a movable element in a given physical system, it is ordinarily equally as desirable to provide continuously by physical means an accurate indication of the position of the element relative to some reference point. For example, it is desirable in certain applications to ascertain the exact position of the valve mechanism in a hermetically sealed valve, or otherwise to determined the exact location of a relatively inaccessible member which is movable within a given system. This is certainly the case if the movable element is operationally significant in the system and if the system itself is a sealed one, or in more general application, if the element is simply not accurately observable.

Where the indicating function is to be provided through the use of electromagnetic induction as a basis of detection, there are numerous parameters which may be relevant to the question of whether the object of accuracy can be obtained. Thus, variants such as temperature, supply voltage, frequency and magnetic geometry fall into this category. An example of such a case is a system in which a linearly movable element of magnetic material is located in a sealed enclosure and energized coil means are distributed along the path of movement of the element in a manner such that the latter is able to move with respect to the coil means. The position of the element can then be generally determined inasmuch as induced voltage in the coil means can be indicative of the position of the element. Since variants, including geometry and temperature parameters, can produce error of indication in this example, accuracy in the indicating function can be increased by providing one or more cooperatively stimulated yet separately responsive circuit modes by which position is measured for comparison to the indication obtained from the general measurement just described. Statistical probability alone is enough to justify this conclusion, but, in addition, at least one separate measurement may be known to be highly accurate for at least some positions of the element and therefore may provide corresponding check points for comparison with the results of the general measurement.

Thus, it is an object of the invention to provide a novel position indicating arrangement in which separate indications of position are obtained for comparative observation through the use of respective circuits which are cooperatively stimulated yet separately responsive.

Another object of the invention is to provide a novel position indicating arrangement in which the position of a movable element is generally indicated and in which at least some positions are accurately indicated to provide corresponding check points for comparison with the results of the general indication.

An additional object of the invention is to provide a position indicating arrangement which is operative to determine with a high degree of accuracy at least some positions of a movable element.

These and other objects of the invention will become more apparent upon consideration of the following detailed description along with the attached drawings, in which.

Figure 3:
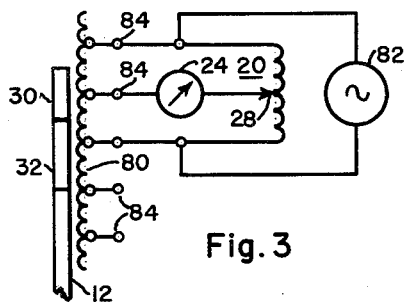
Figure 4:
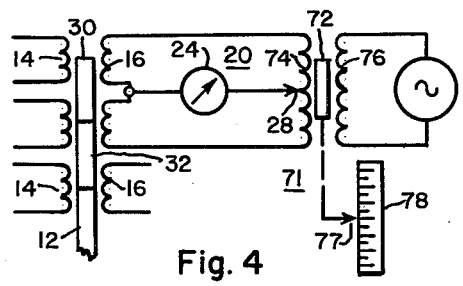
Figure 5:
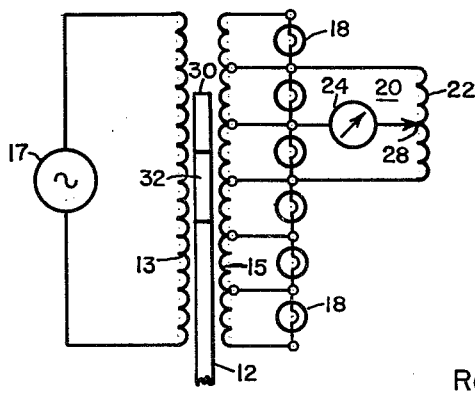

FIGS. 3, 4 and 5 respectively show other embodiments of the invention.

According to the broad principles of the invention, a position indicating arrangement comprises coil means distributed along the path of movement of a movable element which is at least partially formed form magnetic material. The coil means are energized by a fluctuating source and the voltage induced in the coil means varies as a function of the position of the element. Indicating means including a lamp or the like, when readily observable position evidence is desired, or other indicating means including a voltmeter or the like, when perhaps more definite position evidence is desired, can be connected to various points along the coil means to provide information as to where the movable element is located. Where the coil means includes primary and secondary portions and if it is preferred to provide added accuracy in the position indicating function, means can be provided for producing an output quantity which is measured by another voltmeter as being representative of the total primary electromotive force which in turn varies as a function of the position of the movable element. Means for producing an exact position indication of a portion of the movable element at one or more points along the path of movement can also be provided, for example, to provide one or more highly accurate or precise check points for comparison with the indication obtained from the lamp(s) or voltmeter(s) previously described. The two means just described can be provided separately, but advantages in accuracy and efficiency are gained when they are provided together.

Figure 1:
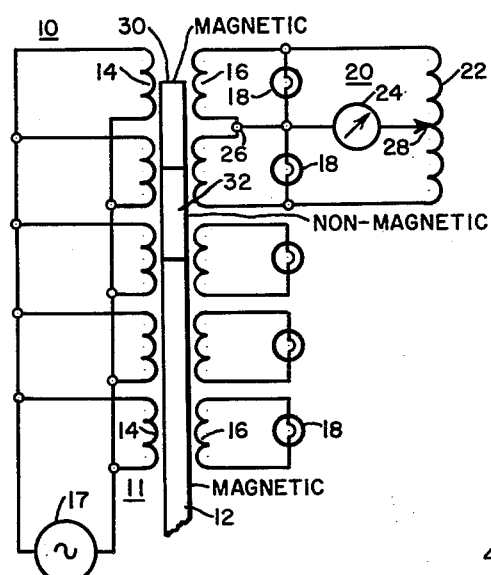
FIGURE 1 is a schematic diagram of a position indicating arrangement formed in accordance with the principles of the invention.

In the interest of clarifying these broad principles of the invention, reference is to be made to FIGURE 1 where there is shown an arrangement 10 for indicating the position of an elongated element 12 which, in this instance, is movable linearly. As examples of utility, the element 12 might be used for controlling flow in a fluid system, for the positioning of a tool, or for controlling the rate at which a reaction occurs in a given system.

The position indicating arrangement 10 includes coil means 11 preferably comprising a plurality of primary coils 14 which can be magnetically coupled with a plurality of respective secondary coils 16. However, as shown in FIG. 3, a single continuous coil (or a serial grouping of coils) or, as shown in FIG. 5, a multiply-tapped transformer having a continuous primary coil 13 and a continuous secondary coil 15 or a transformer (not shown) having a plurality of primaries and (or) secondaries may be desired, although advantages in efficiency can be gained through the use of the coil combination shown in FIG. 1.

The coils 14 and 16, preferably being of uniform length, are distributed longitudinally along the path of movement of the movable element 12. Regarding the movable element 12 as extending longitudinally in the upstanding direction, it is assumed here, for clarity, that suitable means (not shown) are provided for supporting the movable element 12 and for moving the same according to a desired pattern and that the supporting means can provide upper and lower limits of movement for the movable element 12. In one produced embodiment of the invention, each of the serially and tandemly arrayed coils 14 and 16 were approximately three inches in length, and the movable element 12 was supported for movement generally along a path defined by the coils 14 and 16.

The primary coils 14, in this case, are connected in parallel with each other to a substantially constant fluctuating or alternating current source 17. Accordingly, changes in inductive impedance of the primary coils 14 as a result of movement of the movable element 12 affects substantially only primary voltage and not primary current. The secondary coils 16 are juxtaposed to respective primary coils 14 and serve to produce respective voltages indicative of the position of the movable element 12. Thus, as the movable element 12 moves upwardly successive primary coils 14 are caused to produce additional magnetic flux, which links both the affected primary coil 14 and the juxtaposed secondary coil 16, because of the reduced magnetic reluctance which characterizes the magnetic material of the movable element 12. Accordingly, the primary magnetomotive force is thereby increased even though, as noted earlier, the average R.M.S. primary current is held substantially constant. In addition, the increased flux linking the successive secondary coils 16 is sufficient to produce voltages in these coils for purposes of indication.

An indicator lamp 18, which may be mounted on an instrument panel to operate as voltage indicating means, can be connected across each secondary coil 16 and can be so designed and selected as only to light when the movable element 12 is sufficiently inserted into or coupled with the secondary coils 16 as to be considered located at the position of the coupled coil or coils 16. Alternately, a voltmeter (not shown) can be connected across each secondary coil 16 to give continuous readings of voltage to indicate incremental or intermediate movement of the movable element 12 relative to the associated secondary coil 16. In this alternate case, a master voltmeter (not shown) can also be provided with associated switching circuitry (not shown) for either manual or automatic connection to the respective secondary coils 16 in providing the position indicating function. As suggested earlier, the secondary may be comprised of a continuous tapped coil in place of the coils 16, in which case a voltmeter connected across the entire continuous coil would provide a course indication of the position of the movable element 12 and the intermediate voltage indicating means would produce a relatively fine position indication.

Since it is highly impractical to provide the primary coils 14 and the secondary coils 16 with respective conforming magnetic geometries, such as linear ones, the position indicating function as described in the preceding paragraph is not characterized with preciseness but it is accurate enough to be acceptable in certain applications. Thus, only in the case where each coil 14 or 16 is so formed in geometry as to enable each secondary coil 16 to produce identical functional relationships between its output voltage and the adjacent positions of the movable element 12 would accuracy in the position indicating function be optionally high, and only if other parameters were justifiably assumed to have neglectable effect upon the object of accuracy.

Irrespectively of the conformal nature of the geometry of the coils 14 or 16, supplemental indicators are employed to augment the accuracy of the position indicating function of the arrangement 10. Thus, means are provided in FIGURE 1 for giving one or more highly accurate or precise check points along the path of movement of the movable element 12. In this manner, the position of the movable element 12 is determined with high accuracy when it assumes the check positions and is determined within the degree of accuracy which is otherwise provided when it assumes the positions intermediate the check positions. The check positions therefore serve to demonstrate the position indicating error on the part of the lamps 18 or the previously described voltmeter(s).

In this case, the check indications are provided through the use of a voltage detecting or a balancing network 20, for example one which includes an inductive impedance element in the form of a balancing coil 22 and a voltmeter 24 for detecting predetermined voltage or, as here, null voltage conditions in the network 20. As an alternative, if adjacent secondary coils 16 are reversely wound, peak voltage conditions may be used as a basis of detection. The coil 22 may be connected across any pair of successive secondary coils 16 so as to indicate precisely one or more positions of the movable element 12 relative to the connected pair of coils 16, or it may, by suitable means readily ascertainable by artisans skilled in the pertaining art, be so connected as to be manually or automatically switchable across any pair of successive secondary coils 16 with the switching desirably being controlled or directed to the pair of secondary coils adjacent the topmost one of the lighted lamps 18, as viewed in FIG. 1. Accordingly, a plurality of precisely determined position indications are made available in an efficient and simple manner for checking purposes. The voltmeter 24 is connected between a junction 26 of the selected pair of secondary coils 16 and a tap 28 provided on the coil 22. In this instance, the tap 28 is provided centrally of the coil 22, but in other applications, as will become apparent hereafter, the tap 28 may be provided in other positions.

To provide the stimuli for the functioning of the coil 22 and the voltmeter 24, the movable element 12 is provided with a magnetic portion 30 which is preferably provided with a length less than twice that of any secondary coil 16 to obtain the desired preciseness in measurement and to be generally magnetically isolated from the remainder of the movable element 12. Thus, in this case, the magnetic portion 30 is provided adjacent one end of the movable element 12 and a non-magnetic portion 32 is provided inwardly of the magnetic portion 30 as a part of the movable element 12 so as to isolate the magnetic portion 30 from the remainder of the movable element 12. As examples the magnetic material may be 416 stainless steel and the non-magnetic material may be 304 stainless steel. As to the matter of fabrication, any suitable securing means may be employed for constructing the movable element 12 in the form described. In addition, the magnetic portion 30, if desired can be so sized or formed as to produce secondary voltages which are sufficient for operating the network 20 but which are insufficient for operating the lamps 18.

When the magnetic portion 30 is positioned so as to be centered relative to two adjacent secondary coils 16 as shown in FIGURE 1, the voltages produced in the adjacent coils 16 by electromagnetic induction are equal, and, since the coil tap 28 is centrally located of the coil 22, equal drops of voltage arise in the separate portions of the coil 22 so that no current flows through the voltmeter 24 and a null condition therefore exists. Inherently, therefore, environmental conditions commonly affecting the adjacent coils 16 have little or no effect on the resulting indication since their effects are cancelled and preciseness in position measurement is thereby enhanced. Slight movement of the magnetic portion of the movable element 12 which causes the magnetic portion 30 to move to either side of its centrally located position will result in an imbalance of induced voltages and therefore a current flow through the voltmeter 24. It is clear then that a plurality of positions corresponding at least to the plurality of junctions between successive secondary coils 16 can be indicated with a high degree of accuracy.

Moreover, the coil tap 28 can be provided as a movable one so as to provide an indication of all intermediate positions of the movable element 12 as well as those corresponding to the positions determined when the magnetic portion 30 is centrally located over any junction of two adjacent secondary coils 16. If the respective magnetic geometries of the primary coils 14 and the secondary coils 16 are provided accurately and conformally then the entire range of position indications is given precisely. In either instance, the coil tap 28 is moved until a null condition is obtained in the voltmeter 24, and the new position of the coil tap 28 is representative of the position of the movable element 12. In place of a movable coil tap, the voltmeter 24 may be calibrated directly to read the position of the movable element 12.

Alternately, as shown in FIG. 4, the balancing network 20 can include a movable core transformer 71, in which a magnetic slug 72 is formed to match the movable element portion 30 and in which a secondary coil or coils 74 is or are formed to match successive secondary coils 16. The transformer 71 also includes a primary coil 76 properly energized to match the corresponding effect of the energized primary coils 14. Accordingly, movement of the slug 72 until a null condition is obtained on the voltmeter 24 serves to indicate the position of the movable element portion 30 through the use of a responding indicator such as a pointer 77 associated with a properly calibrated scale 78.

If, as earlier noted as a useable alternate in FIG. 3, a single continuous coil 80 is utilized, the balancing network 20 is separately energized by a fluctuating source 82. Thus, taps 84 are used to divide the coil 80 into equal segments, and the indicating function is obtained on a balancing basis similar to that described in connection with FIG. 1. In this case as well as in the movable tap and the movable slug cases, the network 20 can, if desired, be utilized alone for indicating purposes since it provides position indications over the range of movement of the movable element 12 and, in addition, provides at least some precisely determined check points.

Figure 2:
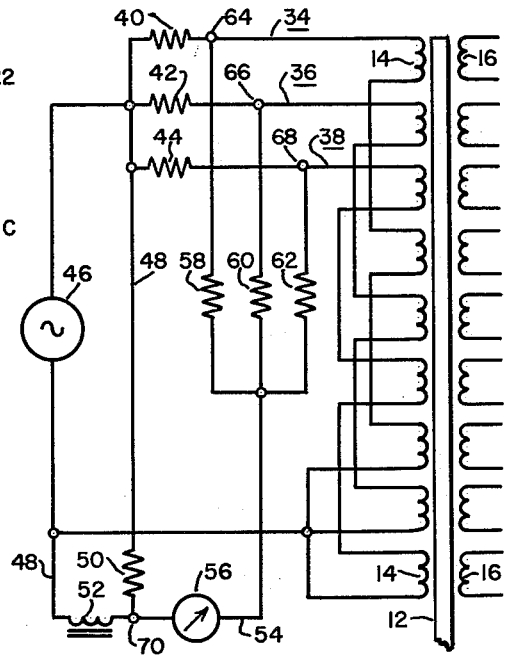
FIG. 2 is a modification of the arrangement depicted in FIGURE 1.

If additional accuracy or guarantee of the position indicating function is desired, the arrangement can be provided with circuit means coupled to the primary coils 14 for producing an output quantity or voltage representative of the total primary magnetomotive force and therefore the position of the movable element 12 as exemplified in FIGURE 2. In this manner, the resulting additional indication can be compared with the indication or the indications previously described as a basis for giving statistical or even more accurate evidence of the true position of the movable element 12.

Thus, in the example of FIGURE 2, the position indicating arrangement 10 is provided with the primary coils 14 so connected as to be provided in three separate branches 34, 36 and 38 and so interrelated (here in serial form) within the respective branches as to provide a relatively simple basis for detecting changes in produced primary magnetomotive force. The primary coils 14 can all be serially interconnected in a single branch (not shown), but it is desirable to utilize a plurality of branches as exemplified here in order to prevent failure of any one primary coil 14 from negating the entire position indicating function. Thus, a rough indication of position can still be obtained although one or two of the branches 34, 36 and 38 may have failed in use. It is to be noted that in FIGURE 2 the average or R.M.S. primary current or currents in branches 34, 36 and 38 is or are held generally constant similarly to the case of FIGURE 1, here through the use of resistors 40, 42 and 44 connected serially in the respective branches 34, 36 and 38 and also serially in relation to a fluctuating or alternating voltage source 46.

To detect the produced magnetomotive force in the primary coils 14, which force varies as a function of the position of the movable element 12, there are provided means including a reference circuit branch 48 having a resistor 50 and an inductor 52 and including a bridging circuit branch 54 having a current or voltage meter 56 and respective resistors 58, 60 and 62 which, in order substantially to isolate the primary coil circuitry, are connected in series with the meter 56 and respective junctions 64, 66 and 68 in the branches 34, 36 and 38. In certain applications, the reference circuit branch 48 may include other impedance combinations, but it is preferred to utilize the combination described here to obtain phase matching with the resistors 40, 42 and 44 and the primary coils 14. The resistor 50 and the inductor 52 in the reference branch 48 can be so provided in impedance value as to produce a reference potential at a junction 70 between these elements equal to the potential which exists at the junctions 64, 66 and 68 when the movable element 12 is in its lowermost position, as viewed in FIG. 2.

With these circumstantial conditions, the meter 56 is then inactivated. As the movable element 12 is moved upwardly, the magnetomotive force (and, because of substantially constant primary current conditions, the inductance) of successive primary coils 14 is increased with the result that the potential of the junctions 68, 66 and 64 successively is increased. This effect is enabled because the average or R.M.S. primary current or currents is or are actually reduced by a very nominal amount due to the increase in inductive impedance with the result that slightly less current is produced through any or all of the resistors 40, 42, 44 and therefore less voltage drop is produced across these resistors. The potential of the reference branch junction 70, of course, will have remained constant because of the substantially constant voltage across this branch from the source 46.

Accordingly, any differential in potential between the circuit junctions 68 or 66 or 64 and the reference branch junction 70 produces a current through the resistor 62 or 60 or 58 and a summed or net current through the meter 56 which, if properly calibrated provides an indication of the position of the movable element 12. Because of the presence of the resistors 58, 60 and 62, the current through the meter 56 is at all times extremely small relative to the current or currents through the primary coils 14. Moreover, it is extremely small relative to the steady state current which flows through the reference circuit branch resistor 50 and the inductor 52 in the reference circuit branch 48 and therefore has little or no effect upon the constancy of the potential of the reference branch junction 70.

The indicating scheme of FIGURE 2 can be used with the indicating schemes, including the alternate ones, described in connection with FIGS. 1 and 4 so as to provide a plurality of indications that can be obtained from the position indicating arrangement 10 thereby determining with a high degree of certainty the true position of the movable element 12. To provide compatability, the meter 56 of FIG. 2 can be calibrated to accommodate the effects of the non-magnetic portion 32 of the element 12 in FIG. 1 and still provide a reading which continuously indicates the position of the movable element 12. As one example, a combination of indicating schemes in the arrangement 10 can include those shown in FIGS. 1 and 2 in which case the indicator lamps 18 give a continuous general indication of the position of the movable element 12 while the meter 56 gives a continuous indication of the position of the movable element 12 with a higher degree of accuracy and the voltmeter 24 serves to detect with a very high or exact degree of accuracy various positions of the movable member 12 along its path of travel. Of course, if the balancing network 20 provides a continuous position indication on the voltmeter 24 as described in connection with FIGS. 2 and 4, then the exemplified indicator lamps 18 or the meter 56 may serve merely as secondary indicator means in the event the balancing network 20 as a primary means were for some reason to fail altogether.

In the foregoing description, the mode of operation of several arrangements has been related to point out the principles of the invention, the description, therefore has only been illustrative of the invention, and, accordingly, is desired that the invention be not limited by the embodiments described here but, rather, that it is accorded an interpretation consistent with the scope and spirit of its broad principles.

What is claimed is:

1. An arrangement for indicating the position of a movable element fabricated at least partially from a magnetic material, said arrangement comprising elongated primary coil means distributed along the path of said movable element and energizable by a source of fluctuating potential, a plurality of elongated secondary coils positioned for respective substantial magnetic coupling with said primary coil means when said movable element is positioned adjacently thereto, and said movable element including an elongated magnetic portion having its long dimension less than twice that of any one of said secondary coils, said magnetic portion being magnetically isolated from the remainder of said movable element, first voltage indicating means coupled across each of said secondary coils to indicate generally and continuously the varying magnetic coupling thereof with said primary coil means and the attendant adjacent positionings of said movable element and its magnetic portion, circuit means connectable to any given pair of adjacent ones of said secondary coils for producing a predetermined voltage condition at a given juxtaposition of said magnetic portion of said movable element relative to said pair of secondary coils, and second voltage indicating means coupled to said circuit means to indicate said voltage condition and to provide at least one precisely determined position of said movable element and its magnetic portion for comparison to the indications obtained from said first voltage indicating means.

2. An arrangement for indicating the position of a movable element formed at least partially from a magnetic material, said arrangement comprising elongated primary coil means distributed along the path of said movable element and energizable by a source of fluctuating potential, a plurality of elongated secondary coils positioned for substantial magnetic coupling with said primary coil means when said movable element is positioned adjacently thereto, and said movable element including an elongated magnetic portion having less length than substantially twice that of any one of said secondary coils and being magnetically isolated from the remainder of said movable element, first voltage indicating means coupled across each of said secondary coils to indicate generally and continuously the varying magnetic coupling thereof with said primary coil means and the attendant adjacent positionings of said movable element and its magnetic portion, and circuit means connectable to any given pair of adjacent ones of said secondary coils for producing a predetermined voltage condition at a given juxtaposition of said magnetic portion of said movable element relative to said pair of secondary coils, and second voltage indicating means coupled to said circuit means to indicate said voltage condition and to provide at least one precisely determined position for comparison to the indications obtained from the first-mentioned voltage indicating means, said circuit means including a centrally tapped balancing impedance element connected across said pair of secondary coils, said second voltage indicating means being connected between the central tap of said balancing impedance and the junction of said pair of secondary coils.

3. An arrangement for indicating the position of a movable element formed at least partially from a magnetic material, said arrangement comprising a plurality of elongated primary coils energizable by a source of fluctuating potential, a plurality of elongated secondary coils positioned for substantial magnetic coupling with respective ones of said primary coils during respective juxtapositions of said movable element relative thereto, voltage indicating means connected across each of said secondary coils to indicate generally and continuously the varying magnetic coupling thereof with said primary coil means and the attendant adjacent positionings of said movable element, at least some of said primary coils being connected together in serial relation with said source, current regulating means for holding the average current through said serially connected coils to a substantially constant value, and circuit means for producing an output quantity which is representative of the change in electromotive force of said serially connected primary coils as a result of said movable element moving along the same so as to provide a position indication for comparison to that of said voltage indicating means.

4. An arrangement for indicating the position of a movable element formed at least partially from a magnetic material, said arrangement comprising a plurality of elongated primary coils energizable by a source of fluctuating potential, a plurality of elongated secondary coils positioned for substantial magnetic coupling with respective ones of said primary coils during respective juxtapositions of said movable element relative thereto, voltage indicating means connected across each of said secondary coils to indicate generally and continuously the varying magnetic coupling thereof with said primary coil means and the attendant adjacent positionings of said movable element, and at least some of said primary coils being connected together in serial relation with said source, a first resistive element being connected serially with said serially connected primary coils to provide an average current of substantially constant value through the latter, and circuit means for producing an output quantity which is representative of the change in electromotive force of said serially connected primary coils as a result of said movable element moving along the same, said circuit means including a reference branch having balancing impedance means and being connected across said source, and said circuit means in addition including a bridge branch having a second resitive element and another voltage indicating means in serial relation and being connected between a reference potential point of said balancing impedance means and a given potential point in the serial branch including said first resistive element and said serially connected primary coils.

5. An arrangement for indicating the position of a movable element formed at least partially from a magnetic material, said arrangement comprising a plurality of elongated primary coils energizable by a source of fluctuating potential, a plurality of elongated secondary coils positioned for substantial magnetic coupling with respective ones of said primary coils during respective juxtapositions of said movable element relative thereto, first voltage indicating means connected across each of said secondary coils to indicate generally and continuously the varying magnetic coupling thereof with said primary coil means and the attendant adjacent positionings of said movable element, one group of said primary coils being connected together in serial relation with said source, another group of said primary coils also being connected together in serial relation with said source, a first resistive element being connected serially with said one coil group and another first resistive element being connected serially with said other coil group to provide respective average currents of substantially constant value through said one and said other coil groups, and circuit means for producing an output quantity which is representative of the change in electromotive force of said serially connected primary coils as said movable element is moved along the same, said circuit means including a reference branch having a second resitive element and an inductive element in serial relation with one junction therebetween and being connected across said source, and said circuit means in addition including a bridge branch having second voltage indicating means therein and connected serially from said one junction both to one third resistive element and to another third resistive element, said one and said another third resistive elements being respectively connected to another junction between said first resitive element and said one coil group and to still another junction between said other first resistive element and said other coil group.

6. An arrangement for indicating the position of a movable element formed at least partially from a magnetic material, said arrangement comprising a plurality of elongated primary coils energizable by a source of fluctuating potential, a plurality of elongated secondary coils positioned for substantial magnetic coupling with respective ones of said primary coils during respective juxtapositions of said movable element relative thereto, first voltage indicating means connected across each of said secondary coils to indicate generally and continuously the varying magnetic coupling thereof with said primary coil means and the attendant adjacent positionings of said movable element, said movable element including an elongated magnetic portion having less length than substantially twice that of any one of said secondary coils and being magnetically isolated from the remainder of said movable element, and circuit means connectable to any given pair of adjacent ones of said secondary coils for producing a predetermined voltage condition at a given juxtaposition of said magnetic portion of said movable element relative to said pair of secondary coils, second voltage indicating means coupled to said circuit means to indicate said voltage condition, at least some of said primary coils being connected together in serial relation with said source, current regulating means for holding the average current through said serially connected coils to a substantially constant value, and means for producing an output quantity which is representative of the change in electromotive force of said serially connected primary coils as said movable element is moved along the same.

7. An arrangement for indicating the position of a movable element having an elongated magnetically isolated magnetic portion, said arrangement comprising elongated primary coil means distributed along the path of said movable element and energizable by a source of fluctuating potential, a plurality of elongated secondary coils positioned for substantial magnetic coupling with said primary coil means when said magnetic portion is positioned adjacently thereto, said magnetic portion being of less length than substantially twice that of any one of said secondary coils, circuit means connectable to any given pair of adjacent ones of said secondary coils for producing a predetermined voltage condition at a given juxtaposition of said magnetic portion relative to said pair of said secondary coils, said circuit means including a transformer having a secondary portion connected across said pair of secondary coils and having an excited primary portion and a magnetic core which is movable for voltage balancing purposes and which thereby provides an indication of the position of said magnetic portion of said movable element, and voltage indicating means coupled to said circuit means for indicating said voltage balance.

8. An arrangement for indicating the position of a movable element formed at least partially from a magnetic material, said arrangement comprising a plurality of elongated primary coils energizable by a source of fluctuating potential, a plurality of elongated secondary coils positioned for substantial magnetic coupling with respective ones of said primary coils when said movable element is positioned adjacently thereto, indicating means connected across each of said secondary coils to indicate generally and continuously the varying magnetic coupling thereof with said primary coil means and the attendant adjacent positionings of said movable elements, and circuit means for producing an output quantity which is representative of the change in electromotive force of said serially connected primary coils as a result of said movable element moving along the same so as to provide a position indication for comparison to that of said voltage indicating means.

9. An arrangement for indicating the position of a movable element, said arrangement comprising elongated primary and secondary coil means distributed along the path of said movable element, said primary core means being energizable by a source of fluctuating potential, and at least said secondary coil means being divided into a plurality of substantially uniform segments, said movable member having an elongated magnetic portion less in length than substantially twice that of any of said secondary coil segments, and circuit means connectable to any given pair of adjacent ones of said secondary coil segments for producing a predetermined voltage condition at a given juxtaposition of said magnetic portion of said movable element relative to said pair of coil segments, first voltage indicating means coupled to said circuit means to indicate said voltage condition so as to produce at least one precisely determined position of said movable element, second voltage indicating means connected across each of said secondary coil segments to indicate generally and continuously the varying magnetic coupling thereof with said primary coil means and the attendant adjacent positionings of said movable element, and means for producing an output quantity which is representative of the change in electromotive force of said primary coil means as a result of said movable element moving along the same so as to provide a position indication for comparison to that of said first voltage indicating means.

10. An arrangement for indicating the position of a movable element, said arrangement comprising elongated primary and secondary coil means distributed along the path of said movable element, said primary coil means being energizable from a source of fluctuating potential, said primary and second coil means being respectively divided into a plurality of substantially uniform segments, said movable member having an elongated magnetic portion less in length than substantially twice that of any of said secondary coil segments, and circuit means connectable to any given pair of adjacent ones of said secondary coil segments for producing a predetermined voltage condition at a given juxtaposition of said magnetic portion of said movable element relative to said pair of coil segments, first voltage indicating means coupled to said circuit means to indicate said voltage condition so as to produce at least one precisely determined position of said movable element, second voltage indicating means connected across each of said secondary coil segments to indicate generally and continuously the varying magnetic coupling thereof with said primary coil means and the attendant adjacent positionings of said movable element, and at least some of said primary coil segments being connected together in serial relation with said source, a first resistive element being connected serially with said serially connected primary coil segments to provide an average current of substantially constant value through said primary coil segments, and means for producing an output quantity which is representative of the change in electromotive force of said serially connected primary coil segments as a result of said movable element moving along the same, said output means including a reference branch having balancing impedance means and being connected across said source, and said output means including a bridge branch having a second resistive element and another voltage indicating means in serial relation and being connected between a reference potential point of said balancing impedance means and a given potential point in the serial branch including said first resistive element and said serially connected primary coil segments.

References Cited by the Examiner
UNITED STATES PATENTS

| | | | |
|---|---|---|---|
| 2,430,757 | 11/47 | Conrad et al. | 340—196 |
| 2,459,210 | 1/49 | Ashcraft | 340—199 |
| 2,564,221 | 8/51 | Hornfeck | 340—199 |
| 3,005,969 | 10/61 | Wysocki | 340—199 |

NEIL C. READ, Primary Examiner.

FREDERICK M. STRADER, Examiner.